United States Patent

[11] 3,567,072

| [72] | Inventor | Donald Tenhulzen |
| | | R.R. 1, Firth, Nebr. 68358 |
| [21] | Appl. No. | 786,602 |
| [22] | Filed | Dec. 24, 1968 |
| [45] | Patented | Mar. 2, 1971 |

[54] WEIGHING AND AUTOMATIC DUMPING ATTACHMENT FOR COMBINES AND LIKE MACHINES
11 Claims, 3 Drawing Figs.

[52] U.S. Cl.............................................. 222/77,
222/176, 214/2, 177/112, 177/145, 177/163, 177/245
[51] Int. Cl........................................................ G01g 13/22
[50] Field of Search........................................... 177/111, 112, 116, 245, 145, 161, 163; 222/55, 58, 176, 77; 214/2

[56] References Cited
UNITED STATES PATENTS

| 544,803 | 8/1895 | Wilde.............................. | 177/112 |
| 1,011,370 | 12/1911 | Reese............................ | 177/116 |
| 3,254,729 | 6/1966 | Behlen........................ | 177/111X |

Primary Examiner—Stephen J. Tomsky
Assistant Examiner—George H. Miller, Jr.
Attorney—Gene D. Watson ABSTRACT: An automatic unloading attachment for a combine or like machine comprises a load-receiving carrier pan which rides in a pair of fixed L-shaped tracks. A linkage mechanism provides resilient support for the carrier pan such that as the weight of the load material collected in the pan increases the pan is lowered along the tracks. Movement of the pan to the elbows in the tracks, dictated by a predetermined load weight, causes pivoting of the pan to unload the material collected therein. The resilient support arrangement for the pan returns the pan to the initial position thereof after unloading. The attachment is mounted on the combine as a single detachable unit.

PATENTED MAR 2 1971 3,567,072

INVENTOR

Donald Ten Hulzen

BY *Gene D. Watson*

ATTORNEY

3,567,072

WEIGHING AND AUTOMATIC DUMPING ATTACHMENT FOR COMBINES AND LIKE MACHINES

BACKGROUND OF THE INVENTION

1. Field of the Invention

The present invention relates to vehicular machines such as harvesters and combines and more particularly to means for automatically depositing the harvested chaff and other residue collected by such machines in spaced piles.

2. The Prior Art

Because the depositing of chaff and other residues separated during the harvesting or threshing process into spaced piles is both strenuous and tedious work there have been a number of attempts to automate this process. In one such prior art attempt a trailerlike device is provided for receiving the chaff and for dumping the chaff in piles when the load becomes heavy enough to trip a tripping mechanism for the device. A series of weights and springs serve to return the device to the normal position thereof after tipping. The tipping and return mechanism provided is quite complicated thus presenting problems in both manufacture and maintenance.

SUMMARY OF THE INVENTION

In accordance with the invention an improved unloading device is provided for use with a vehicle, such as a harvester or combine, used in collecting material during the travel thereof, the unloading device effecting automatic unloading of the collected material at spaced intervals responsive to the weight of the collected load. The unloading device of the invention is efficient as well as relatively uncomplicated and inexpensive to manufacture and maintain as compared with prior art devices performing a similar function.

In accordance with a presently preferred embodiment of the invention unloading of a carrier pan for receiving a load of material, which, in the case of a combine, is the chaff and other residue separated during the threshing process, is effected by movement of the carrier under the weight of the load received. The carrier pan rides in tracks which cause pivoting of the pan to unload the contents thereof when the weight of the material in the pan causes movement of the pan beyond a predetermined position along the length of the tracks. The pan is resiliently supported by a spring and linkage arrangement to permit movement thereof, under the weight of the load, along the tracks and is returned by this arrangement to the initial unloaded position thereof after the contents are dumped. The entire unloading arrangement is adapted to be mounted as a single unit on the combine.

Other features and advantages of the invention not specifically enumerated here will be described in or will be apparent from the detailed description of a presently preferred embodiment of the invention found hereinbelow.

DESCRIPTION OF THE PREFERRED EMBODIMENT

Figure 1:
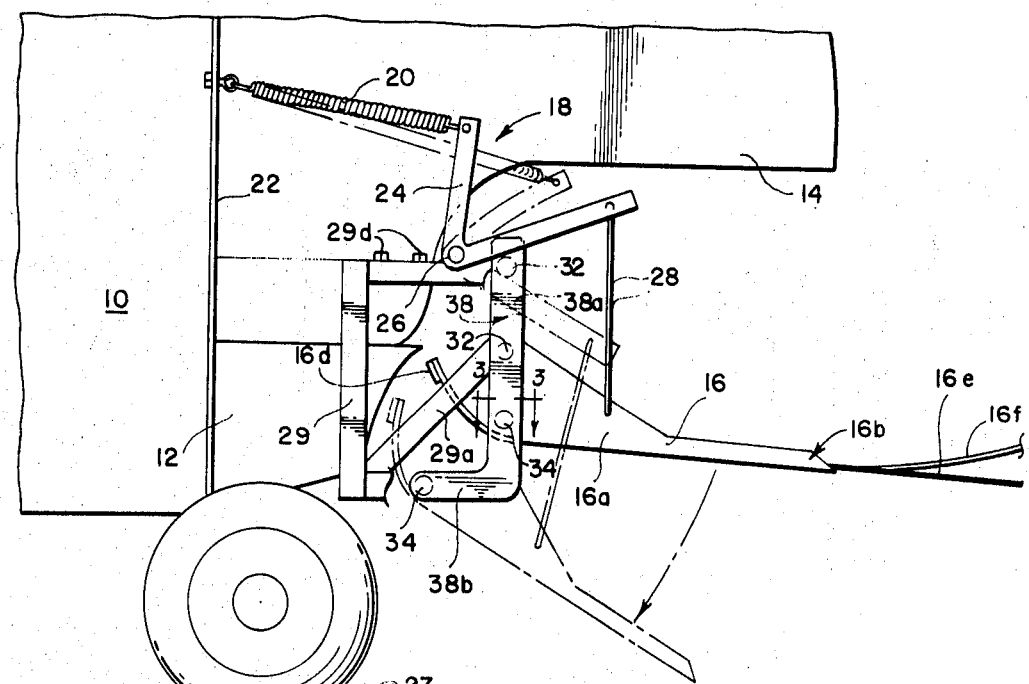
FIG. 1 is a side elevation view of a presently preferred embodiment of the invention with the dumping position of the carrier pan shown in phantom lines.

Referring to FIG. 1, there is shown a portion of a combine generally denoted 10 which includes a grain shoe 12 and an overhanging chute 14. In accordance with the present invention a movable carrier pan 16 is located below chute 14 and is adapted to receive chaff and other residue material discharged therefrom. Carrier 16 is supported at each side by means of a linkage mechanism generally denoted 18 so as to permit movement thereof under the load received from chute 14. It will be understood that linkage mechanism 18 is duplicated on both sides of pan 16 although the construction on only one side thereof will be specifically described. Linkage mechanism 18 includes a coil spring 20 one end of which is affixed to an upright member 22 on or forming a part of combine 10, and the other end of which is affixed to one arm of a two-armed generally V-shaped connecting member 24. Connecting member 24 is pivoted at the joinder of the two arms thereof about an axis provided by a stabilizing shaft 26. As may best be seen in FIG. 2 shaft 26 is mounted for rotation in first and second bearings 27 (one of which can be seen in FIG. 2) respectively supported on first and second mounting brackets 29 and 31. Thus shaft 26 provides a fixed pivot for linkage mechanism 18 which aids in a manner set forth hereinbelow in providing dumping of carrier pan 16. Linkage mechanism 18 further includes a connecting link 28 affixed to the other arm of connecting member 24 and to an upright side portion 16a of carrier pan 16.

Figure 2:
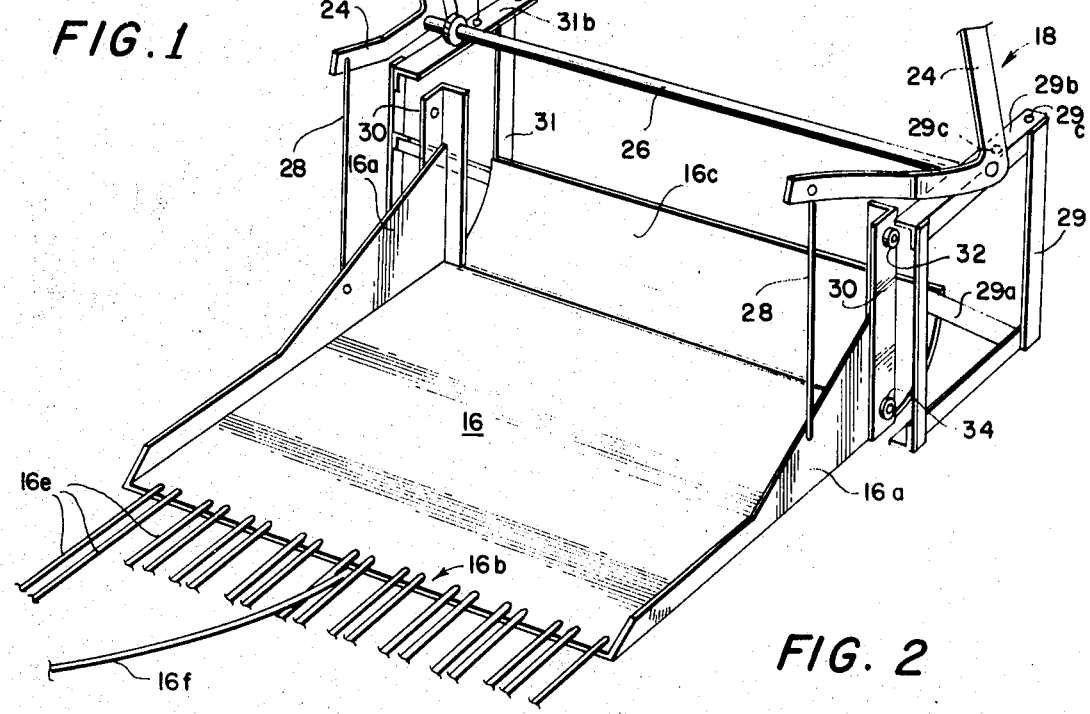
FIG. 2 is a perspective view of a portion of the embodiment of FIG. 1.
Figure 3:
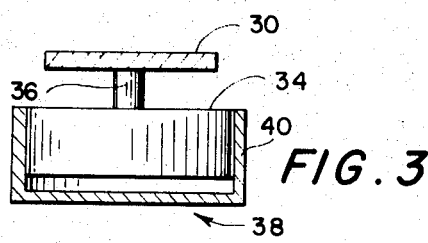
FIG. 3 is an enlarged sectional view taken generally along line 3-3 of FIG. 1.

Carrier pan 16 includes first and second angle arms 30 which are affixed to side portions 16a thereof and which extend generally vertically when the pan is in an unloaded condition. Angle arms 30 each include outwardly extending roller members 32 and 34 each mounted for rotation about a stub shaft 36 (see FIG. 3). Each set of rollers 32 and 34 is adapted to be received in a generally L-shaped track 38 (not shown in FIG. 2). Bracket 29 is broken away in FIG. 1 to show track 38 which is welded thereto. In FIG. 2, tracks 38 have been removed to show rollers 32 and 34. As can be seen in FIG. 3, each track 38 comprises a generally U-section channel 40. Rollers 32 and 34 ride on the inner surfaces of the flanges of channel 40 and thus the path of movement of carrier pan 16 is determined by the shape of track 38. Track 28 includes a generally vertical portion 38a and a shorter generally horizontal portion 38b, horizontal portion 38b extending forwardly from vertical portion 38a in the direction of forward travel of the combine 10. Tracks 38 are duplicated on both sides of combine 10 and, as states, each track 38 is welded to a corresponding mounting bracket 29 or 31.

Mounting brackets 29 and 31 are substantially identical in construction and only the construction of bracket 29 will be considered in any detail. Bracket 29 is generally rectangular in construction and includes a reinforcing strut 29a welded in the position shown to the basic rectangular configuration. An upper generally horizontal flange 29b includes first and second bolt holes 29c therein which enable bracket 29 to be bolted by means of bolts 29d shown in FIG. 1 onto a mating member on the combine 10. Thus the entire dumping attachment may be mounted as a single unit onto the combine 10 by means of four bolts and two springs (springs 20).

The operation of the unloading device of the present invention may be best understood from a consideration of FIG. 1. The position of carrier 16 shown in solid lines in FIG. 1 represents the unloaded position thereof. As material discharged from chute 14 is received in carrier 16 the weight thereof will cause carrier 16 to move downwardly against the biasing force provided by spring 20. Under these conditions rollers 32 and 34 will ride downwardly in the vertical leg 38a of each track 38, and connecting member 24 will pivot clockwise about shaft 26. Carrier 16 will be gradually lowered as the weight of the load therein increases but will remain generally horizontal until lower roller 34 reaches the elbow in track 38. At this time the pivoting force of the load will cause rapid movement of lower roller 34 to the left as shown in FIG. 1 to an end position in horizontal leg 38b. This movement of lower roller 34 permits pivoting or tipping of carrier pan 16 so that the chaff slides out of the mouth 16b of pan 16 onto the ground to form a pile. When carrier pan 16 is thus unloaded the springs 20 will cause the entire pan to return to the normal position thereof shown in solid lines in FIG. 1, rollers 32 and 34 riding in tracks 38 to their initial positions.

Preferably, the front end 16c of carrier pan 16 is made heavier than the mouth or dumping end 16b. This may be accomplished, for example, by welding a strip of metal 16d (FIG.

1) across the width of the pan 16 or by fabricating the pan with a heavier gauge material on the curved front-end portion 16c thereof. It has been found that this construction results in both better dumping of the pan 16 and better and surer return of the pan 16 to the initial unloaded position thereof, although it will be understood that such a pan construction is not necessary to the operation of the device of the invention.

Extending rearwardly from the mouth 16b of pan 16 are a series of tines 16e which serve to increase the capacity of the pan. Tines 16e also shift the center of gravity of an accumulated load, and hence the center of gravity of a loaded pan, further rearwardly, so as to increase the turning or pivoting force moment on the pan. A centrally located tine 16f prevents a pile discharged from carrier pan 16 from "fluffing" or from being partially returned to the pan. Tine 16f is substantially longer than the other tines 16e (approximately 2 feet longer in a specific embodiment) and, although the curvature thereof is somewhat exaggerated in the drawings, tine 16f extends outwardly from pan 16 generally parallel to tines 16e along the lengths thereof and then curves upwardly as shown. In operation, tine 16f, because of its length, will remain entrapped under the discharged pile for a longer time period than shorter tines 16e as the combine 10 moves further along its path of travel and during this time will continue to prevent the carrier pan 16 from returning to the normal position thereof. Thus tine 16f will ensure that the pan 16 is completely clear of the discharged pile before the returning movement of the pan 16 is initiated and thus, as stated, prevents portions of the pile from being disrupted or returned to the carrier pan 16 by tines 16e or by the mouth portion 16b of the carrier pan. By varying the capacity of the pan and the tension force imposed by the springs, the frequency of dumping and the size of the deposited piles can be varied as desired.

While the horizontal trip paths for the lower rollers are preferred, an alternative construction could utilize rearwardly and downwardly extending trip paths for the upper rollers so that the upper rollers would be released at the trip paths to move rearwardly and permit the pivotal dumping movement. This is a permissible arrangement by virtue of the fact that the accumulated load to be dumped exerts a clockwise pivotal force on the pan which urges the upper rollers rearwardly and the lower rollers forwardly. Therefore, either of the rollers may be released in its biased direction to effect the dumping, followed by a return in the opposite direction and upward movement of the entire pan when all rollers return to the vertical portions of the tracks.

As a further alternative, tension springs running directly from the chute 14 to pan sides 16a could be substituted for the illustrated springs 20, connecting members 24, and links 28. With such a construction, the springs should be connected to the pan sides 16a rather closely adjacent the tracks 38a so as not to exert too substantial a counterclockwise turning force on the pan, and hence inhibit the clockwise dumping movement of the pan under the bias of an accumulated load.

Although the invention has been described in some detail with reference to a presently preferred embodiment thereof it will be understood that modifications other than those specifically set forth may be effected without departing from the scope and spirit of the invention. Thus the scope of the invention is to be determined not from the illustrative embodiment described hereinbefore but rather from the subjoined claims.

I claim:

1. For use in combination with a vehicle for collecting material during the travel thereof, a device for depositing the collected material in spaced piles comprising a movably mounted carrier for receiving the collected material, means defining a path of movement of said carrier for causing an unloading movement of said carrier to dump the collected material when a load of predetermined weight has been collected, and resilient means adapted to be secured to the vehicle for resiliently supporting said carrier to permit movement thereof along said path responsive to the weight of the collected material received by the carrier and for returning said carrier to its initial position.

2. A device as claimed in claim 1 wherein said carrier comprises a carrier pan including a pan portion and a forward portion, said pan portion extending substantially horizontally in the unloaded position thereof to receive the collected material.

3. A device as claimed in claim 1 wherein said path defining means comprises two spaced tracks defining a generally downwardly extending path for said carrier, and said carrier is located between said tracks and includes two spaced mounting members on each side for guiding said carrier along said downwardly extending path and supporting said carrier so that the material collecting portion thereof extends outwardly from said downwardly extending path, whereby said carrier can move up and down said path without substantially changing the orientation thereof, and wherein said tracks further define a generally horizontally extending path intersecting said downwardly extending path at a position occupied by one of said mounting members on each side of said carrier when said carrier has reached the desired dumping position, whereby the weight of collected material on said carrier will move the carrier downwardly along said downwardly extending path until said ones of said mounting members reach said horizontally extending path, whereupon said ones of said mounting members will move along said horizontally extending path, and permit said carrier to tilt downwardly and dump the material collected thereon.

4. A device as claimed in claim 1 wherein said carrier includes a plurality of tines extending outwardly of the discharge end thereof, said plurality of tines including a centrally located tine of substantially greater length than the remaining tines for preventing disruption of discharged pile by the returning movement of said carrier.

5. A device as claimed in claim 1 wherein said device is adapted to be attached as a separate unit to the vehicle, said device including means for detachably mounting the device on the vehicle.

6. A device as claimed in claim 1 wherein said resilient means comprises at least one spring member, said device further comprising at least one pivotable linkage means including a fixed pivot shaft, one end of said linkage means being connected to said spring and the other end of said linkage means being connected to said carrier.

7. A device as claimed in claim 6 wherein said linkage means includes first and second arms joined together at one end thereof to form a generally V-shaped construction, said V-shaped construction being pivoted on said pivot shaft at the joinder of said arms, and a connecting member for connecting the free end of one of said arms to said carrier.

8. A device as claimed in claim 1 wherein said path defining means comprises at least one track and wherein said carrier includes means movable in said track and guided thereby.

9. A device as claimed in claim 8 wherein said track is generally L-shaped and comprises a generally vertical leg and a generally horizontal leg, said horizontal leg extending forwardly of said vertical leg in the direction of travel of the vehicle.

10. A device as claimed in claim 8 wherein said track comprises a channel member of generally U-shaped cross section and said means movable in said track comprises roller means carried by said carrier.

11. A device as claimed in claim 10 wherein said roller means includes first and second sets of first and second rollers mounted on opposite sides of said carrier, said first rollers of each set being mounted on an upper portion of the carrier and said second rollers of each set being mounted on a lower portion of the carrier.